US006996712B1

(12) United States Patent
Perlman et al.

(10) Patent No.: US 6,996,712 B1
(45) Date of Patent: Feb. 7, 2006

(54) DATA AUTHENTICATION SYSTEM EMPLOYING ENCRYPTED INTEGRITY BLOCKS

(75) Inventors: Radia J. Perlman, Acton, MA (US); Stephen R. Hanna, Bedford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 830 days.

(21) Appl. No.: 09/632,557

(22) Filed: Aug. 4, 2000

Related U.S. Application Data

(63) Continuation-in-part of application No. 09/250,935, filed on Feb. 18, 1999, now abandoned.

(51) Int. Cl.
*H04L 9/18* (2006.01)
(52) U.S. Cl. .................. 713/161; 713/168; 380/268
(58) Field of Classification Search ............... 713/161, 713/181, 168; 380/37, 42, 268, 269
See application file for complete search history.

(56) References Cited

U.S. PATENT DOCUMENTS

| | | | | |
|---|---|---|---|---|
| 4,924,513 A | * | 5/1990 | Herbison et al. | ........... 713/161 |
| 5,081,678 A | * | 1/1992 | Kaufman et al. | ........... 713/161 |

(Continued)

OTHER PUBLICATIONS

Rivest, Chaffing and Winnowing: Confidentiality Without Encryption, Apr. 24, 1998.*

(Continued)

*Primary Examiner*—Andrew Caldwell
*Assistant Examiner*—Minh Dieu Nguyen

(74) *Attorney, Agent, or Firm*—Kudirka & Jobse, LLP

(57) ABSTRACT

A data authentication system that at the sender produces for a plurality of data packets a plurality of "integrity checks" by selecting an integrity function from a family or set of integrity functions, selecting a number of bytes from a given packet and manipulating the bytes in accordance with the selected integrity function to produce the integrity check. The system then selects corresponding bytes or bytes that are offset from the corresponding bytes from a next packet and produces a next associated integrity check using the same or another selected integrity check function, and so forth. The system encrypts the integrity checks associated with the plurality of data packets using, for example, a shared secret key, and produces an integrity block. The system then sends the encrypted integrity block and the data packets to the intended recipients. A recipient decrypts the integrity block using the shared secret key and reproduces the integrity checks. It then uses the integrity checks to authenticate the associated data packets by manipulating selected data bytes in accordance with selected integrity check functions. The recipient thus authenticates a plurality of data packets by performing a single decryption operation and a plurality of relatively fast integrity check operations using a selection of integrity check functions that are unknown to an interloper. The sender may also include in a transmission one or more extraneous, or "chaff," data packets, which are data packets that intentionally fail the associated integrity checks. The sender may, for example, include in a transmission multiple sets of packets with the same sequence numbers. The recipient readily determines which of the packets with the same sequence numbers are valid using the appropriate integrity check. However, an interloper who cannot decipher the encrypted integrity block cannot as easily determine which of the packets are valid, and thus, cannot determine which packets to alter and/or how to alter these packets without detection by the integrity checks.

66 Claims, 4 Drawing Sheets

U.S. PATENT DOCUMENTS

| | | | |
|---|---|---|---|
| 5,266,942 A | | 11/1993 | Stoller |
| 5,349,642 A | * | 9/1994 | Kingdon ..................... 713/161 |
| 5,440,633 A | * | 8/1995 | Augustine et al. .......... 713/161 |
| 5,625,693 A | * | 4/1997 | Rohatgi et al. ............. 713/187 |
| 5,850,449 A | * | 12/1998 | McManis ................... 713/161 |
| 5,946,467 A | * | 8/1999 | Pathakis et al. ............ 709/236 |
| 5,948,119 A | | 9/1999 | Bock et al. |
| RE36,752 E | * | 6/2000 | Koopman, Jr. et al. ....... 380/25 |
| 6,327,660 B1 | * | 12/2001 | Patel .......................... 713/193 |

OTHER PUBLICATIONS

Menezes et al., Handbook of Applied Cryptography, 1997, CRC Press, pp. 323-327.*

Rivest, "Chaffing and Winnowing: Confidentiality Without Encryption", Apr. 24, 1998, http//theory.Ics.mit.edu/-rivest/chaffing.txt.

* cited by examiner

DATA AUTHENTICATION SYSTEM EMPLOYING ENCRYPTED INTEGRITY BLOCKS

FIELD OF INVENTION

This application is a continuation-in-part of Ser. No. 09/250,935, billed Feb. 18, 1999.

The invention relates generally to data communications networks and, in particular, to systems for authentication of data transferred over the networks.

BACKGROUND OF THE INVENTION

When a sender transfers data over a network, an interloper may intercept and alter the data and then transfer the altered data to the intended recipients. The recipients, who presume the data are valid because they appear to come from a trusted sender, may then use the altered data directly, or introduce errors into associated data processing systems. To ensure that the received data were not altered enroute by an interloper, the network may include a data authentication system that essentially encodes the data at the sender and decodes the data at the recipient to detect changes in the data.

One known data authentication process involves including a digital signature in a data packet. The digital signature is produced by first encoding the packet data bytes to produce a cryptographic hash and then, typically, encrypting the hash using the sender's private key. A recipient uses the sender's public key to decrypt the digital signature and reproduce the hash. It then encodes the received data using the same cryptographic hash function and compares the result with the decrypted hash. If the two hashes match, the data is considered authentic, that is, the received data is considered to be the same data that was sent by the sender who holds the private key. This authentication process works well, but it is both computation intensive and time consuming at the recipient end.

A slightly less computation intensive authentication process that may be used by senders and recipients that share a secret key is commonly referred to as a message integrity code, or "MIC," process. The MIC process produces an integrity code by concatenating the shared secret key with the data and then encoding the data and the key using a cryptographic hash function. The result, which is the integrity code, is then sent along with the data to a recipient who shares the secret key. The recipient similarly concatenates the shared secret key with the received data and encodes the data and the key using the hash function. If the result matches the received integrity code, the data is considered authentic. The MIC authentication process works well and is relatively reliable, assuming the holders of the shared key are trusted. However, this process still requires producing a hash based on all of the data bytes in the data packet, and is thus still relatively time consuming.

SUMMARY OF THE INVENTION

The invention is a data authentication system that at the sender produces for one or more data packets a plurality of "integrity checks" that the system then encrypts with a shared secret key, to produce an "integrity block." The system sends the integrity block as part of a data packet or separately. A recipient decrypts the integrity block using the shared secret key and reproduces the integrity checks. It then uses the integrity checks to authenticate the associated data packets. As discussed below, the authentication system uses a relatively weak, and thus, fast and uncomplicated, integrity check function to produce the integrity check, and adds robustness by selecting the integrity check function from a set of known functions and/or selecting from a data packet particular data bytes to manipulate using the selected function. Further robustness is added by encrypting the selection information into integrity checks, which ensures that the selections may vary between packets and that the particular selections are unknown to an interloper.

The recipient performs a single decryption operation and, based on the result, selects the appropriate integrity check function and/or data bytes for the one or more data packets. The recipient then performs one or more fast integrity check operations to authenticate the one or more associated data packets. Accordingly, the authentication system operations are less time consuming and less complex than those of known prior authentication systems of similar robustness.

More specifically, the system selects an integrity check function from a set of known functions and a number of bytes from a given packet and manipulates the bytes in accordance with the selected integrity check function to produce the associated integrity check. The system next, as appropriate, selects from another packet corresponding bytes or bytes that are offset from the corresponding bytes, and produces a next associated integrity check using the same or another selected integrity check function, and so forth. The system then encrypts the integrity checks using a shared secret key, to produce the integrity block, which the system sends along with the one or more data packets to the intended recipients.

A recipient uses the shared secret key to decrypt the integrity block and reproduce the integrity checks. It then associates the integrity checks with the data packets and, for each data packet, selects the appropriate data bytes and authenticates the data using the appropriate integrity check function.

If an interloper intercepts the data packets and the integrity block, the interloper cannot readily interpret the integrity block because of the encryption. Accordingly, the interloper cannot readily determine, for example, which integrity check function to use, which bytes to select for authentication, and thus, how to alter the data and still pass the integrity checks without knowing the secret key. The unknown aspects of the authentication system inhibit the actions of the interloper, even if a relatively simple integrity check function is used and/or only a relatively small number of bytes from a given data packet are used, to produce the associated integrity check.

As discussed in more detail below, the integrity block may include information that is used by the recipient to determine, for a given data packet, which of the integrity check functions was selected and/or which of the data bytes were used to produce the associated integrity check. As necessary, the integrity block includes offset values, interval values and so forth. In addition, the integrity block may also include information, such as packet sequence numbers, that associate the integrity checks with the appropriate data packets. As discussed, all of the information in the integrity block, including the function identifier, the offset or interval values and the sequence numbers, as appropriate, are preferably encrypted and, therefore, unknown to the interloper.

As a further safeguard against an interloper, the authentication system may include in the integrity block a digital signature that is prepared using the sender's private key. The recipient can then test that the integrity block has not been altered by an interloper that knows the shared secret key.

Further, the sender may include digital signatures in the data packets so that the recipient can more robustly test selected data packets.

Alternatively, or in addition, the sender may include in a transmission one or more extraneous, or "chaff," data packets, which are data packets that intentionally fail the associated integrity checks. The sender may, for example, include in a transmission multiple sets of packets with the same sequence numbers. The recipient readily determines which of the packets with the same sequence numbers are valid using the appropriate integrity check. However, an interloper who cannot decipher the integrity block cannot as easily determine which of the packets are valid, and thus, cannot determine which packets to alter and/or how to alter these packets without detection.

To avoid having an interloper reproduce a valid data packet and flood the network with copies, a time stamp may be encrypted into the integrity check. The receiving station then, as discussed in more detail below, checks that the time stamp is valid before passing on or processing the associated data packet or packets. Alternatively, the system may use packet sequence numbers for this purpose, as well as, for associating the integrity checks with the appropriate data packets.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
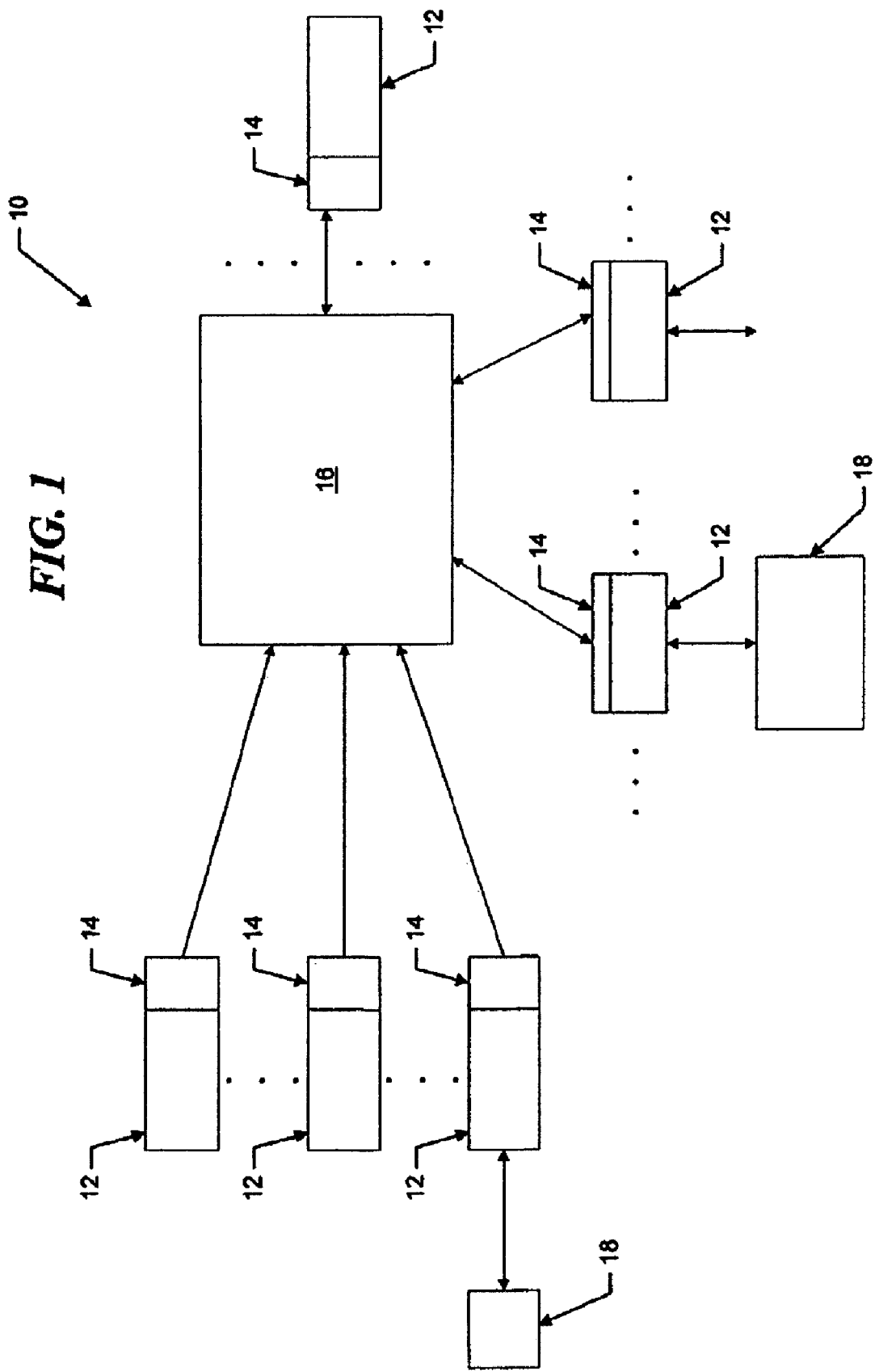
FIG. 1 is a functional block diagram of a network constructed in accordance with the invention.

Referring to FIG. 1, a communications system 10 includes a plurality of end stations 12 that act as either senders or recipients or both. A given sending end station 12 sends data, in the form of data packets, through a communications network 16 to one or more selected receiving end stations 12 that may, for example, be connected to data processing systems 18.

Each end station 12 includes an authentication system 14. When an end station is sending data, the authentication system 14 included therein uses selected information and data bytes from one or more data packets to produce a corresponding set of one or more integrity checks. The authentication system next encrypts the integrity checks in a known manner in accordance with a shared secret key, and produces an "integrity block." The end station 12 then sends the data packets and the integrity block over the communications network 16 to one or more recipient end stations 12 through a network interface 15 (FIG. 2) in a known manner. The integrity block may be included in a data packet or it may be sent as a separate packet, as appropriate. The operations to produce the integrity checks and the integrity block are discussed below with reference to FIG. 2. Hereinafter, we refer to the end stations 12 as senders and recipients based on their operations in the transmission under discussion.

Figure 2:
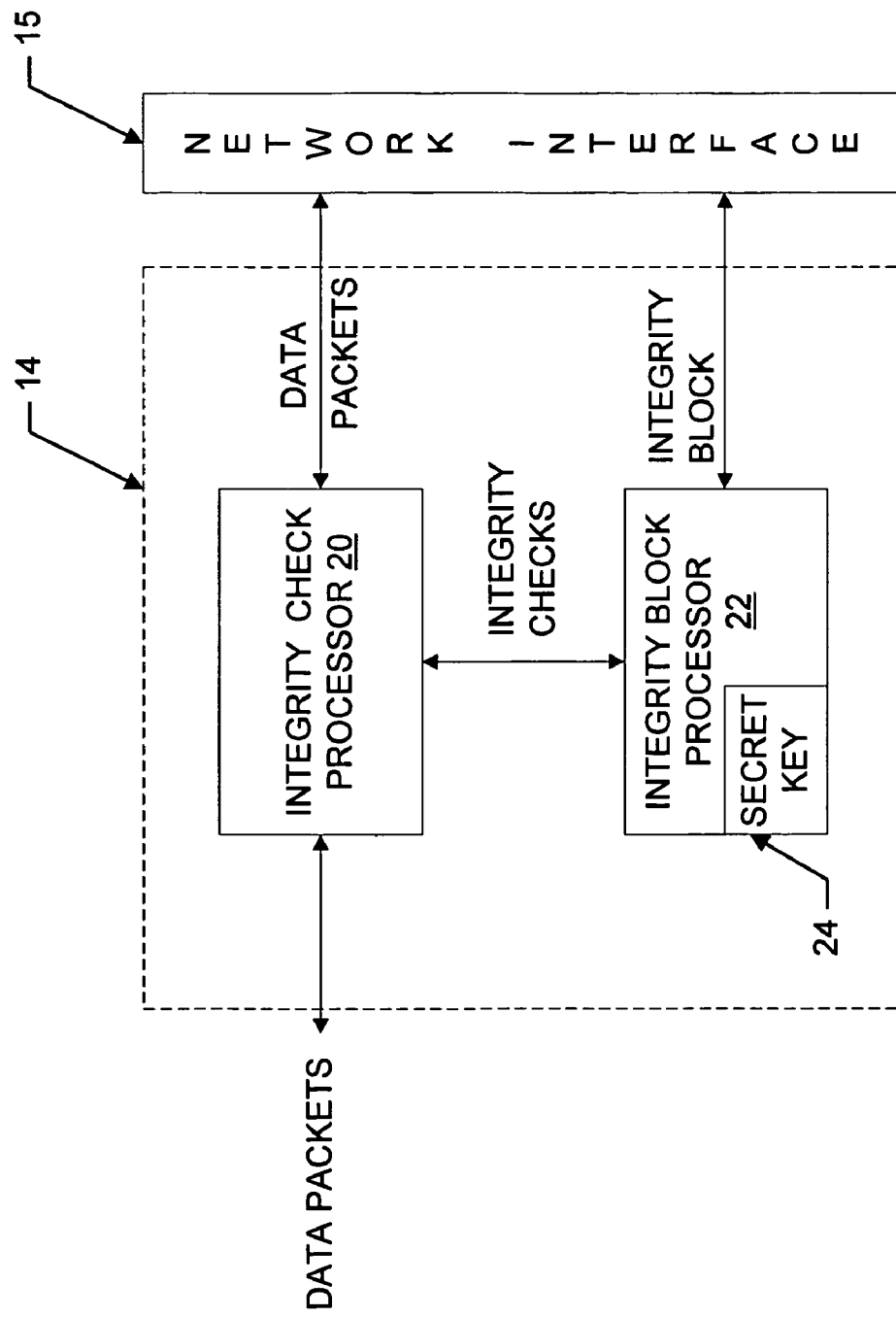
FIG. 2 is a more detailed block diagram of an authentication system that is included in the network of FIG. 1.

Referring now to FIG. 2, the authentication system 14 includes an integrity check processor 20 that, during send operations, produces the integrity checks. During receive operations the integrity check processor 20 uses the integrity checks to determine if the received data packets are authentic, as discussed below. An integrity block processor 22, which is also included in the authentication system 14, encrypts the integrity checks and produces the integrity block that is sent over the network to the intended recipients. The integrity block processor 22 also decrypts a received integrity block, to reproduce the integrity checks that are then used by the integrity check processor 20 to authenticate the received data packets.

We discuss below the basic authentication process performed by the authentication system 14 and thereafter several variations of that process. The basic authentication process uses shared secret keys. However, as discussed below, the sender and recipient may also use a public/private key combination for further robustness.

The integrity check processor 20 selects from a first data packet "m" data bytes, with 1<m<d and where "d" is the number of bytes in the data packet, and manipulates the bytes in accordance with a selected integrity check function to produce an associated integrity check. The processor 20 in the example manipulates the selected bytes by concatenating them to produce the integrity check. The processor then supplies the integrity check to the integrity block processor 22 for encryption. The integrity check processor 20 similarly selects m corresponding bytes from the next "p"−1 data packets, with p>1, manipulates the bytes on a per packet basis and supplies them to the integrity block processor 22 as the associated integrity checks.

When all p integrity checks are supplied to the integrity block processor 22, the processor encrypts them in a known manner using the shared secret key that is held in a register 24. The result of the encryption is an integrity block that is transferred over the communications network 16 to the intended recipients of the p data packets.

The integrity block processor 22 at the recipient readily decrypts the received integrity block in a known manner using the shared secret key, and reproduces the integrity checks for the p data packets. The integrity check processor 20 at the recipient then authenticates each of the p received data packets by manipulating selected bytes from the packet in accordance with the selected integrity check function, or in the example, compares the bytes in the associated integrity check with the corresponding bytes from the appropriate data packet. If the bytes match, the integrity check processor determines that the given data packet is authentic. The authentication system 14 thus authenticates p data packets by performing a single decryption operation and p m-byte compare operations. This is in contrast with known prior systems that authenticate p data packets by performing p separate authentication operations, each of which typically involves manipulating all of the data bytes in the packet in accordance with a relatively complex encoding function. Accordingly, the system 14 authenticates the data packets faster than the known prior systems. Further, the encrypting of the integrity block allows the system to use a less robust, and thus, less complex process to produce the respective individual integrity checks. Accordingly, the system 14 may include less complex circuitry than prior known systems.

As discussed above, the authentication system may produce an encrypted integrity block for a single data packet. If the integrity block is included within the data packet, there will be no delay in authenticating the packet. Otherwise, the system must delay authentication of the packet until receipt of the associated integrity block.

If an interloper intercepts the data packets and the integrity block, it will not be able to decipher the encrypted integrity block, and thus, will not be able to determine which of the data bytes the recipient will use to test the authenticity of a given data packet and/or which integrity function to use. Accordingly, the interloper cannot readily determine from the integrity block how to alter a data packet and still satisfy the associated integrity check, even though the integrity check process is relatively weak. The integrity block, even if it relates only to a single data packet, is thus a relatively robust authentication tool because of the encryption of the individual integrity checks.

Further, the authentication process is not particularly complex or time consuming at the recipient end because the decryption operation is performed once for p data packets, with the decryption operation involving the relatively few bytes of the integrity checks. Also, the p integrity check operations are less complex since they may each involve a relatively small number of data bytes from each packet, and/or may use a relatively simple integrity check function that is easily and quickly performed, such as a CRC function because the selection of the integrity function is not known to unauthorized parties. Accordingly, the decryption and manipulation operations are less time consuming and less complex than the known prior similarly robust authentication techniques, which manipulate all of the data bytes of each of the p data packets in accordance with more complex functions to produce the integrity checks and later to test the authenticity of the p packets.

We discuss below further variations of the basic authentication process. Each variation adds more robustness to the process and, consequently, requires more time and adds complexity to the process at the recipient end.

As discussed above, the integrity check processor 20 at the sender selects m data bytes from each data packet for the integrity checks. If corresponding bytes from each packet are used, an interloper who learns which particular bytes are selected can then alter one or more of the other bytes in a packet without detection. Similarly, if the interloper learns that only a relatively small number of bytes at, for example, the start of the packet, are selected for the integrity check, the interloper can then alter the data bytes at the end of the packet without detection. Accordingly, the authentication system may instead select the data bytes at random from a first data packet and select from subsequent data packets bytes that are offset from those selected from the first packet. The system then includes in the encrypted integrity block information such as offset and interval values, and so forth, to inform the recipient which bytes to select for integrity checking from each of the received data packets.

Alternatively, the system may select data bytes at random from each of the data packets, and include in the integrity block a random number seed value or other information that the recipient needs to reproduce the random byte selections for the various data packets.

The authentication system may also select from a known set of functions or family of functions the integrity check function to use for each packet. The system then includes in the integrity check, prior to encryption, a function identifier or some other information from which the recipient can determine the selected function.

As discussed, the integrity check may include one or more function identifiers that specify to the recipient which integrity check function or functions to select for the associated data packet or packets. Alternatively, the sender and recipient may share a secret mechanism for determining a code to select the functions based on information in the integrity check or the corresponding data packet. For example, the sender and the recipient may share a secret seed that can be used to generate a pseudorandom sequence through some function such as RC4. The recipient then uses the sequence number of the packet or an offset value included in the integrity check as an offset into the sequence, and uses the next n bits to identify the selected identity check function.

The system may also select more than one integrity check function for use with a given data packet. The integrity check then includes a list of the identifiers or associated information and a corresponding list of the results of the encodings. The recipient may then choose one of the selected integrity check functions to authenticate the packet, and compare the result of the encoding of the received bytes using the chosen function with the received result that corresponds to the same function. To avoid detection, an interloper would thus have to produce a forged packet that decoded to the corresponding results for all of selected integrity functions, presumably without knowledge of which functions have been selected for the packet. Accordingly, the combining of more than one integrity functions for each of the p data packets further increases the robustness of the system over the use of a single function selected from the set of functions. This is true even if the set contains a relatively small number of functions.

As a further safeguard, the integrity check processor may encode the selected data bytes, that is, it may combine all or some of the selected bytes by, for example, XORing one or more of the bytes, performing ones complement addition with some or all of the bytes, selectively multiplying or adding the bytes, or performing similar logic functions, before the bytes are further manipulated using the selected integrity check functions. For even greater protection, the integrity check processor 20 may instead or in addition use a cryptographic hash function to encode the selected bytes or some combination of them before the bytes are encoded using the selected integrity check functions. An intermediate station that receives the packet may then determine that a given packet is valid using the selected integrity check function and the encrypted bytes, and leave for the intended destination station the full authentication of the packet using the cryptographic hash.

Before encrypting the integrity checks, the integrity block processor may arrange them in a different order than the associated data packets. At the same time, the system encrypts into the integrity block information that the recipient can use to reassign the integrity checks to the appropriate data packets. If, for example, the data packets include sequence numbers, the integrity block processor may include in the integrity block a list of sequence numbers that associates the integrity checks with the data packets. Alternatively, each integrity check may include the sequence number of the associated data packet. The system may also include in a transmission an integrity block that contains the integrity checks for, for example, a next set of data packets or a previously sent set of data packets. The recipient then uses the information, such as the sequence numbers, included in the integrity block to determine how to assign the integrity checks reproduced from the decrypted integrity block to the appropriate data packets.

An interloper will presumably not be able to associate the out-of-order integrity checks with the appropriate data packets because of the encryption. Accordingly, the interloper will have an even harder task to determine how to alter the various data packets without detection.

The system may encrypt into the integrity block other information that a recipient requires to properly use the integrity checks. For example, the system may include in the integrity block executable code that implements a new integrity check process. The recipient then decrypts the integrity block to reproduce the individual integrity checks and the associated code, and runs the code to authenticate the data packets using the reproduced integrity checks. The system thus need not send the executable code separately to each recipient.

An interloper, even one who learns much about the old integrity check process, will not be able to decipher the code for the new process and will, therefore, not be able to determine how to alter the data bytes to avoid detection by the new integrity check process. For greater robustness, the sender may sign the code with its private key in a known manner, so that the recipient can be sure that an interloper has not altered the code.

Alternatively, the authentication system may include in the integrity block a digital signature that is produced in a known manner using the sender's private key. Before decrypting the integrity block, the recipient authenticates the integrity block using the sender's public key to ensure that the block has not been altered or forged.

For even further robustness, a sender may include in each data packet a digital signature that is encrypted with the sender's private key. A recipient can then decrypt a digital signature with the sender's public key, to double-check the authenticity of a packet that has survived the weaker integrity check process. The recipient can thus use the more time consuming and complex, but stronger, authentication tool to spot check selected packets. With the spot check, the recipient can also detect data that has been forged by an interloper who has access to the shared secret key.

As discussed, the integrity blocks may be encrypted in a known manner, which typically involves providing to the recipients separate initialization vectors for each block. The vectors are used in a known manner to set registers in the encryption hardware to a desired value before the hardware is used to encrypt, in this case, the integrity checks. To optimize the decryption process, the authentication system may instead use the system or method described in U.S. Pat. No. 6,055,316 entitled System and Method for Deriving an Appropriate Initialization Vector for Secure Communications, which allows a recipient to derive the initialization vector directly from the received integrity block. The authentication system thus avoids having to send the vectors separately.

The authentication system may instead include in the integrity check prior to encryption a time stamp or sequence number. The time stamp or sequence number may then be used as the initialization vector.

Figure 3:
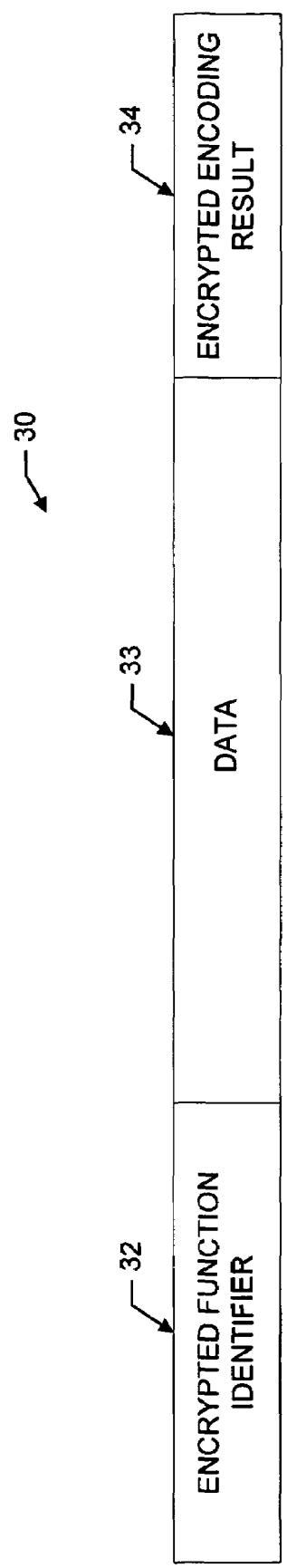
FIG. 3 depicts a data packet that includes an integrity block produced by the system of FIG. 2.

Referring now to FIG. 3, when the integrity block is produced for and included in a single data packet, the integrity block may be separated into two parts, namely, the identifiers for the selected integrity check functions and data bytes, and the results of manipulating the data bytes in accordance with the functions. The two parts may then be separately encrypted so that the identifiers can be included at the start 32 of the data packet 30 and the results of the manipulation included at the end 34 of the data packet. The recipient then uses the function information at the start of the packet to set up the integrity check processor 20 (FIG. 2) and manipulates the data bytes as they are received, to produce a result that can be compared with the result included at the end of the received packet. Before the two values are compared, however, either the result produced by the integrity check processor must be encrypted, or the received result decrypted.

Whether or not the integrity block is included in a data packet, the block may include in each integrity check one or more random bytes, to produce after encryption a value that is not readily decipherable without knowledge of the included random byte or bytes. Alternatively, the time stamp or sequence number discussed above may serve this purpose.

Figure 4:
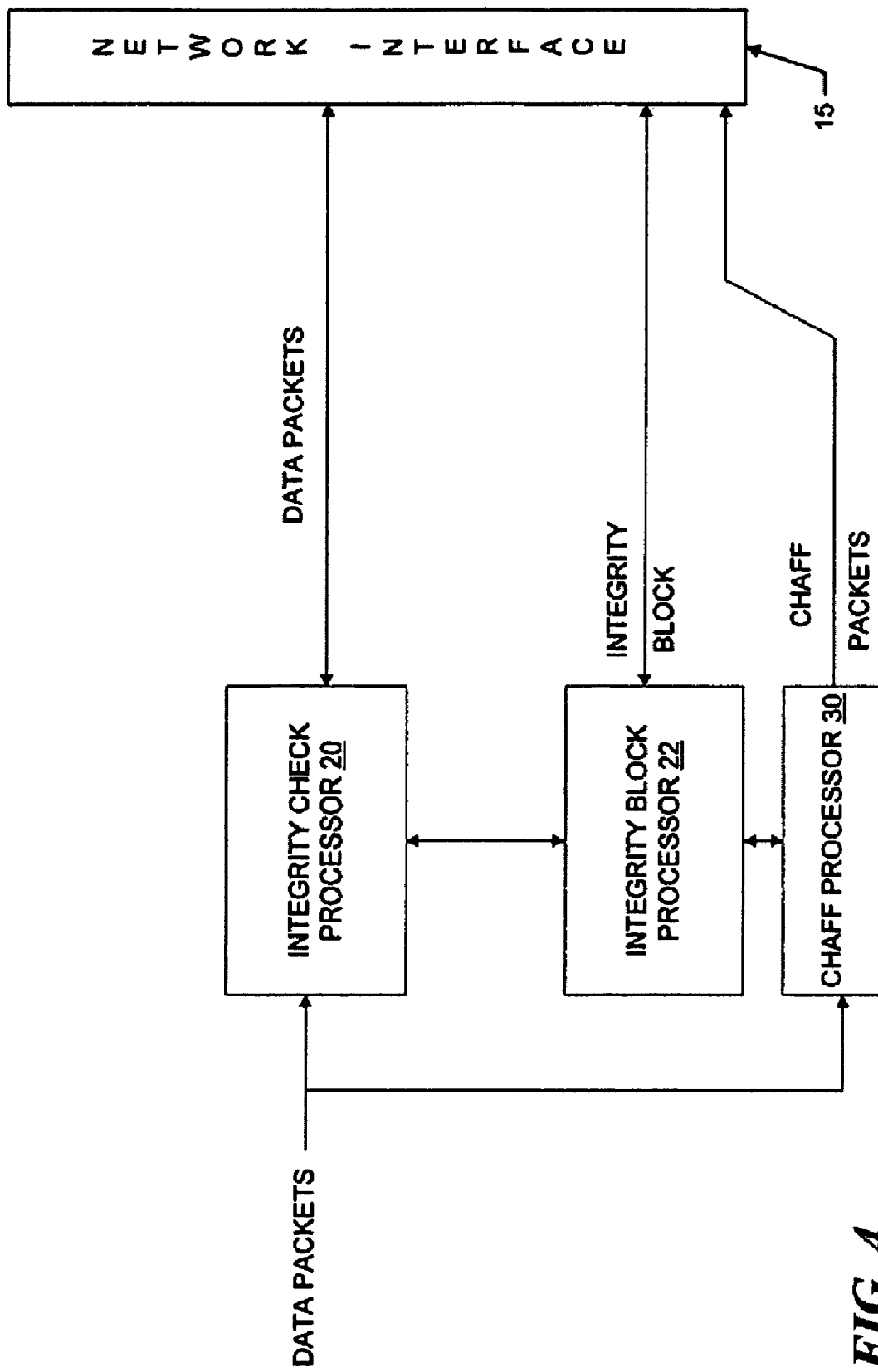
FIG. 4 is a functional block diagram of an alternative authentication system.

Generally, the interloper can not readily access the data packets. If this is not the case, the interloper may be able to capture one or more of them and produce packets that are only slightly altered, and may thus pass the integrity checks. To further inhibit the interloper, an alternative authentication system 14 depicted in FIG. 4 includes, in addition to the processors discussed above, a chaff processor 40 that introduces into the transmission one or more extraneous, or "chaff," data packets that intentionally fail the integrity checks. The chaff data packets have the same sequence numbers as the valid data packets, and an interloper without access to the information contained in the integrity block can not readily determine which of the same-numbered packets is the valid data packet. Accordingly, the interloper can not readily determine which packet to alter to produce a packet that may pass the integrity checks. The recipient, however, readily determines which of the packets are valid data packets, based on the integrity checks, and ignores the rest.

The chaff packets may be used with any of the authentication process variations discussed above. Namely, the chaff packets may be included in a transmission whether or not the integrity checks are concatenations of the selected data bytes or the results of the encoding of the selected data bytes, whether or not the integrity checks are assembled out of order, and so forth.

An interloper with access to the data packets may instead reproduce a valid data packet and send multiple copies of the packet in an attempt to monopolize network bandwidth. To avoid this problem, a recipient checks an included time stamp or packet sequence number against a clock or the values included in previous packets. The recipient then passes on or processes only those packets that have valid time stamps or numbers. For example, the recipient discards packets that include time stamps that fall behind the current time by more than a predetermined amount, where the amount is related to the time it takes the packet to traverse the network and the estimated clock skew among the stations. Similarly, the recipient discards packets with sequence numbers that fall too far behind the sequence numbers contained in the recently received packets.

The foregoing description has been limited to a specific embodiment of this invention. It will be apparent, however, that other processors and various forms of memory, including computer readable media, may be used for storing and executing program instructions pertaining to the techniques described herein. It will be further apparent that variations and modifications may be made to the invention, such as combining one or more of the processors listed separately into a single processor, including in the system stations that produce the encrypted integrity blocks but do not decrypt the integrity blocks and stations that decrypt the integrity blocks but do not encrypt them, and so forth, with the attainment of some or all of its advantages. Therefore, it is the object of the appended claims to cover all such variations and modifications as come within the true spirit and scope of the invention.

What is claimed is:

1. A data authentication system comprising:
   A. an integrity check processor that
      i. selects one or more integrity functions from a set of functions, and
      ii. manipulates m selected data bytes from each of one or more data packets in accordance with the selected integrity check functions to produce one or more integrity checks that correspond to the one or more data packets; and
   B. an integrity block processor that so encrypts the one or more integrity checks produced by the integrity check processor as to permit their decryption only with a non-public key and produces an integrity block that is used to authenticate the data packets;
      wherein the integrity check processor includes in the integrity check an indication of which integrity function to select; and
      wherein the integrity check processor selects more than one integrity function for a given data packet and includes in the integrity check information that identifies a list of the selected functions and a corresponding list of the results of the manipulations.

2. The data authentication system of claim 1 wherein the indication is an offset value for a pseudorandom sequence known to a sender and an intended recipient.

3. The data authentication system of claim 2 wherein the pseudorandom sequence is generated using a seed value known by the sender and the intended recipient.

4. The data authentication system of claim 1 wherein the integrity check processor uses information in the one or more data packets as one or more offset values for a pseudorandom sequence known to a sender and an intended recipient.

5. The data authentication system of claim 4 wherein the pseudorandom sequence is generated using a seed value known by the sender and the intended recipient.

6. The data authentication system of claim 1 wherein the integrity block processor encrypts the integrity checks in accordance with a secret key that is shared by intended recipients of the data packets.

7. The data authentication system of claim 1 wherein the integrity check processor includes in the integrity checks one or more sequence numbers that are associated with the data packets.

8. A data authentication system comprising:
   A. an integrity check processor that
      i. selects one or more integrity functions from a set of functions, and
      ii. manipulates m selected data bytes from each of one or more data packets in accordance with the selected integrity check functions to produce one or more integrity checks that correspond to the one or more data packets; and
   B. an integrity block processor that so encrypts the one or more integrity checks produced by the integrity check processor as to permit their decryption only with a non-public key and produces an integrity block that is used to authenticate the data packets,
      wherein the integrity check processor selects the m data bytes at random from a first data packet, and for any remaining data packets selects data bytes that are offset from the data bytes selected from the first data packet.

9. The data authentication system of claim 8 wherein the integrity check processor produces digital signatures for one or more of the data packets and includes the digital signatures in the respective data packets.

10. The data authentication system of claim 8 wherein the integrity block processor produces a digital signature for the integrity block and includes the digital signature in the integrity block.

11. The data authentication system of claim 8 wherein the selected integrity check function concatenates the selected data bytes from a given data packet to produce the associated integrity check.

12. The data authentication system of claim 8 further including a chaff processor for producing for transmission extraneous packets that are associated with and do not pass one or more of the integrity checks, the chaff processor including the extraneous packets in a transmission that includes the data packets.

13. The data authentication system of claim 8 wherein the integrity block processor encrypts into the integrity block executable code that performs the selected integrity check function.

14. The data authentication system of claim 13 wherein the integrity block processor signs the executable code with a digital signature.

15. A data authentication system comprising:
   A. an integrity check processor that
      i. selects one or more integrity functions from a set of functions, and
      ii. manipulates m selected data bytes from each of one or more data packets in accordance with the selected integrity check functions to produce one or more integrity checks that correspond to the one or more data packets; and
   B. an integrity block processor that so encrypts the one or more integrity checks produced by the integrity check processor as to permit their decryption only with a non-public key and produces an integrity block that is used to authenticate the data packets,
      wherein the integrity block processor encrypts into the integrity block information that identifies the data bytes selected from each of the data packets.

16. The data authentication system of claim 15 wherein the information includes data byte interval and offset values.

17. A data authentication system comprising:
   A. an integrity check processor that
      i. selects one or more integrity functions from a set of functions, and
      ii. manipulates m selected data bytes from each of one or more data packets in accordance with the selected integrity check functions to produce one or more integrity checks that correspond to the one or more data packets; and
   B. an integrity block processor that so encrypts the one or more integrity checks produced by the integrity check processor as to permit their decryption only with a non-public key and produces an integrity block that is used to authenticate the data packets,
      wherein the integrity block processor assembles the plurality of integrity checks in an order that differs from the order of the data packets and encrypts into the integrity block information that associates the integrity checks with the appropriate data packets.

18. The data authentication system of claim 17 wherein the integrity block processor encrypts into the integrity block a list of sequence numbers that corresponds to the order of the integrity checks within the integrity block.

19. A communications network comprising:

A; one or more sending stations for sending data packets;

B. one or more recipient stations for receiving the data packets sent by the sending stations; and C. an authentication system that includes
- i. an integrity block processor for:
  - a. selecting one or more integrity functions from a set of integrity functions,
  - b. manipulating one or more selected data bytes from a given data packet in accordance with the one or more selected integrity check functions to produce the corresponding integrity check, and
  - c. so encrypting the one or more integrity checks that are associated with one or more data packets as to permit their decryption only with a non-public key, producing therefrom an integrity block, and including the integrity block in a transmission to the recipient stations, and
- ii. authentication means for decrypting a received integrity block to reproduce the one or more integrity checks and using information contained in the reproduced integrity checks to select one or more integrity check functions and one or more data bytes to use to determine if data in the associated one or more data packets have been altered, wherein the authentication means uses information in the integrity check or in the associated data packet as an offset value into a pseudo random sequence known to the sender and an intended recipient and uses the next n bits of the sequence to identify the selected integrity check.

20. The communications network of claim 19 wherein the authentication means uses the one or more integrity checks, the integrity check functions identified therein and the selected data bytes from the one or more data packets to determine if the data packets have been altered.

21. The communications network of claim 19 wherein the integrity block processor is included in each of the one or more sending stations and the authentication means is included in each of the one or more recipient stations.

22. The communications network of claim 19 wherein the integrity block processor encrypts the integrity checks and the authentication means decrypts the integrity blocks in accordance with one or more secret keys that are shared by the sending stations and the intended recipient stations.

23. The communications network of claim 19 wherein the integrity block processor encrypts into an integrity block the information that identifies the integrity check function.

24. The communications network of claim 19 wherein the integrity block processor further includes in the integrity block sequence numbers that correspond to the associated data packets.

25. The communications system of claim 19 wherein the authentication means further produces a digital signature for each data packet and includes the digital signature in the data packet.

26. The communications system of claim 19 wherein the authentication means concatenates selected data bytes from a given data packet to produce the associated integrity check.

27. The communications system of claim 19 wherein the authentication means encodes selected bytes from a given data packet to produce the associated integrity check.

28. The communications system of claim 19 further including a chaff processor that produces for transmission one or more extraneous packets that are associated with and do not pass one or more of the integrity checks, the chaff processor including the extraneous packets in a transmission with the associated data packets.

29. The communications system of claim 19 wherein the integrity block processor further includes in the integrity block executable code that performs an integrity check process.

30. The communications system of claim 29 wherein the integrity block processor includes in an integrity block a digital signature that corresponds to the executable code.

31. A communications network comprising:

A. one or more sending stations for sending data packets;

B. one or more recipient stations for receiving the data packets sent by the sending stations; and C. an authentication system that includes
- i. an integrity block processor for:
  - a. selecting one or more integrity functions from a set of integrity functions,
  - b. manipulating one or more selected data bytes from a given data packet in accordance with the one or more selected integrity check functions to produce the corresponding integrity check, and
  - c. so encrypting the one or more integrity checks that are associated with one or more data packets as to permit their decryption only with a non-public key, producing therefrom an integrity block, and including the integrity block in a transmission to the recipient stations, and
- ii. authentication means for decrypting a received integrity block to reproduce the one or more integrity checks and using information contained in the reproduced integrity checks to select one or more integrity check functions and one or more data bytes to use to determine if data in the associated one or more data packets have been altered, wherein the integrity block processor selects one or more data bytes at random from a first data packet and selects from the remaining data packets data bytes that are offset from the data bytes selected from the first data packet based on the information contained in the associated integrity checks.

32. A communications network comprising:

A. one or more sending stations for sending data packets;

B. one or more recipient stations for receiving the data packets sent by the sending stations; and C. an authentication system that includes
- i. an integrity block processor for:
  - a. selecting one or more integrity functions from a set of integrity functions,
  - b. manipulating one or more selected data bytes from a given data packet in accordance with the one or more selected integrity check functions to produce the corresponding integrity check, and
  - c. so encrypting the one or more integrity checks that are associated with one or more data packets as to permit their decryption only with a non-public key, producing therefrom an integrity block, and including the integrity block in a transmission to the recipient stations, and
- ii. authentication means for decrypting a received integrity block to reproduce the one or more integrity checks and using information contained in the reproduced integrity checks to select one or more integrity check functions and one or more data bytes to use to determine if data in the associated one or more data packets have been altered, wherein the integrity block processor encrypts into an integrity block the information that identifies the data bytes selected for each of the one or more data packets by the integrity block processor.

33. The communications network of claim 32 wherein the information includes data byte interval and offset values.

34. A communications network comprising:
  A. one or more sending stations for sending data packets;
  B. one or more recipient stations for receiving the data packets sent by the sending stations; and
  C. an authentication system that includes
    i. an integrity block processor for:
      a. selecting one or more integrity functions from a set of integrity functions,
      b. manipulating one or more selected data bytes from a given data packet in accordance with the one or more selected integrity check functions to produce the corresponding integrity check, and
      c. so encrypting the one or more integrity checks that are associated with one or more data packets as to permit their decryption only with a non-public key, producing therefrom an integrity block, and including the integrity block in a transmission to the recipient stations, and
    ii. authentication means for decrypting a received integrity block to reproduce the one or more integrity checks and using information contained in the reproduced integrity checks to select one or more integrity check functions and one or more data bytes to use to determine if data in the associated one or more data packets have been altered, wherein the authentication means assembles the integrity checks in an order that differs from the order of the associated data packets and encrypts into the integrity block information that associates the integrity checks with the appropriate data packets.

35. The communications network of claim 34 wherein the authentication means further encrypts into the integrity block a list of data packet sequence numbers that corresponds to the order of the integrity checks within the integrity block.

36. A method of authenticating data that is sent in data packets, the method including the steps of:
  A. selecting one or more integrity functions from a set of integrity functions;
  B. manipulating selected data bytes from a first data packet in accordance with one or more of the selected integrity functions to produce an integrity check;
  C. so encrypting the integrity check as to produce an integrity block in which the integrity check can be decrypted only with a non-public key;
  D. sending the integrity block to intended recipients, wherein the step of selecting the integrity functions includes:
    i. using information in the data packet as an offset value into a pseudorandom sequence, and
    ii. using the next n bits of the sequence as the integrity function identifier.

37. The method of claim 36 wherein the step of selecting the integrity functions includes providing associated identifiers as part of the integrity check.

38. A method of authenticating data that is sent in data packets, the method including the steps of:
  A. selecting one or more integrity functions from a set of integrity functions;
  B. manipulating selected data bytes from a first data packet in accordance with one or more of the selected integrity functions to produce an integrity check;
  C. so encrypting the integrity check as to produce an integrity block in which the integrity check can be decrypted only with a non-public key;
  D. sending the integrity block to intended recipients;
  E. decrypting a received integrity block to reproduce the integrity check;
  F. selecting one or more integrity check functions from the set of functions;
  G. using the reproduced integrity check and the selected integrity check functions to determine if the first data packet is authentic;
  H. manipulating data bytes from additional data packets in accordance with one or more of the selected integrity check functions to produce additional integrity checks;
  I. encrypting the additional integrity checks into the integrity block;
  J. decrypting the received integrity block to reproduce the additional integrity checks;
  K. selecting one or more integrity check functions; and
  L. using the reproduced additional integrity checks and the selected integrity check functions to determine if respective additional data packets are authentic,
    wherein the step of manipulating data bytes selects the data bytes at random from the first data packet and selects from the additional data packets data bytes that are offset from the data bytes selected from the first data packet.

39. The method of claim 38 further including in the step of encrypting the integrity checks, performing the encryption in accordance with a secret key that is available to the recipients.

40. The method of claim 39 further including in the step of decrypting the integrity block, decrypting the block in accordance with the secret key.

41. A method of authenticating data that is sent in data packets, the method including the steps of:
  A. selecting one or more integrity functions from a set of integrity functions;
  B. manipulating selected data bytes from a first data packet in accordance with one or more of the selected integrity functions to produce an integrity check;
  C. so encrypting the integrity check as to produce an integrity block in which the integrity check can be decrypted only with a non-public key;
  D. sending the integrity block to intended recipients;
  E. decrypting a received integrity block to reproduce the integrity check;
  F. selecting one or more integrity check functions from the set of functions;
  G. using the reproduced integrity check and the selected integrity check functions to determine if the first data packet is authentic;
  H. manipulating data bytes from additional data packets in accordance with one or more of the selected integrity check functions to produce additional integrity checks;
  I. encrypting the additional integrity checks into the integrity block;
  J. decrypting the received integrity block to reproduce the additional integrity checks;
  K. selecting one or more integrity check functions; and
  L. using the reproduced additional integrity checks and the selected integrity check functions to determine if respective additional data packets are authentic,
    wherein the step of encrypting the integrity checks further includes encrypting into the integrity block information that identifies the data bytes selected from the data packets.

42. A method of authenticating data that is sent in data packets, the method including the steps of:
   A. selecting one or more integrity functions from a set of integrity functions;
   B. manipulating selected data bytes from a first data packet in accordance with one or more of the selected integrity functions to produce an integrity check;
   C. so encrypting the integrity check as to produce an integrity block in which the integrity check can be decrypted only with a non-public key;
   D. sending the integrity block to intended recipients;
   E. decrypting a received integrity block to reproduce the integrity check;
   F. selecting one or more integrity check functions from the set of functions;
   G. using the reproduced integrity check and the selected integrity check functions to determine if the first data packet is authentic;
   H. manipulating data bytes from additional data packets in accordance with one or more of the selected integrity check functions to produce additional integrity checks;
   I. encrypting the additional integrity checks into the integrity block;
   J. decrypting the received integrity block to reproduce the additional integrity checks;
   K. selecting one or more integrity check functions; and
   L. using the reproduced additional integrity checks and the selected integrity check functions to determine if respective additional data packets are authentic,
      further including in the step of encrypting the integrity checks;
      the step of encrypting into the integrity block data byte interval and offset values.

43. The method of claim 42 wherein the step of manipulating the data bytes to produce the integrity checks further includes the step of including in the integrity checks sequence numbers that correspond to the associated data packets.

44. A method of authenticating data that is sent in data packets, the method including the steps of:
   A. selecting one or more integrity functions from a set of integrity functions;
   B. manipulating selected data bytes from a first data packet in accordance with one or more of the selected integrity functions to produce an integrity check;
   C. so encrypting the integrity check as to produce an integrity block in which the integrity check can be decrypted only with a non-public key;
   D. sending the integrity block to intended recipients;
   E. decrypting a received integrity block to reproduce the integrity check;
   F. selecting one or more integrity check functions from the set of functions;
   G. using the reproduced integrity check and the selected integrity check functions to determine if the first data packet is authentic;
   H. manipulating data bytes from additional data packets in accordance with one or more of the selected integrity check functions to produce additional integrity checks;
   I. encrypting the additional integrity checks into the integrity block;
   J. decrypting the received integrity block to reproduce the additional integrity checks;
   K. selecting one or more integrity check functions; and
   L. using the reproduced additional integrity checks and the selected integrity check functions to determine if respective additional data packets are authentic,
      wherein the step of encrypting the integrity checks includes assembling the integrity checks in an order that differs from the order of the associated data packets.

45. The method of claim 44 wherein the encrypting step further includes the step of encrypting into the integrity block a list of sequence numbers that corresponds to the order of the integrity checks.

46. The method of claim 44 further including the step of producing a digital signature for each data packet and including the digital signature in the data packet.

47. The method of claim 44 further including the step of producing a digital signature for the integrity block and including the signature in the block.

48. The method of claim 44 wherein the step of manipulating the selective data bytes includes concatenating the selected data bytes from a given data packet to produce the associated integrity check.

49. The method of claim 44 wherein the step of manipulating the selected data bytes includes encoding the selected bytes from a given data packet to produce the associated integrity check.

50. The method of claim 44 further including the step of including in a transmission extraneous packets that are associated with and do not pass one or more of the integrity checks.

51. The method of claim 44 wherein the step of encrypting the integrity checks further includes encrypting into the integrity block executable code that performs an integrity check process.

52. The method of claim 51 wherein the encrypting step further includes encrypting into the integrity block a digital signature associated with the code.

53. A data authentication system comprising:
   A. an integrity block processor that receives a plurality of data packets and an associated integrity block, the integrity block processor manipulating the integrity block to produce a plurality of integrity checks that correspond to the data packets, and
   B. an integrity check processor that employs a non-public key to decrypt the integrity block and thereby produce the plurality of integrity checks and that uses the integrity checks, integrity check functions selected from a set of functions and selected data bytes from the data packets to determine if any of the data packets have been altered;
      wherein the integrity block processor further produces from the integrity block information to determine which data bytes to select from the data packets, and
      wherein the integrity check processor uses information in the integrity checks to determine which data bytes to select from the one or more data packets.

54. The authentication system of claim 53 wherein the integrity block processor produces from the integrity block information to select which integrity check functions to use to manipulate the selected data packets.

55. The authentication system of claim 54 wherein the information determines which function or functions to use for each data packet.

56. The authentication system of claim 53 wherein the integrity block processor uses a shared secret key to decrypt the integrity block.

57. The authentication system of claim 53 wherein the integrity block processor decrypts the integrity block to provide to the integrity check processor executable code to use to manipulate the selected data bytes.

58. The authentication system of claim 53 wherein the integrity check processor uses a digital signature included in the integrity block to authenticate the integrity block.

59. The authentication system of claim 53 wherein the integrity check processor uses one or more digital signatures included in the one or more data packets to further authenticate the data packets.

60. A computer data signal embodied in a carrier wave and representing sequences of instructions for authenticating data packets, the instructions comprising instructions for:
   configuring at least one sending station to produce an encrypted integrity block for a plurality of data packets using one or more integrity check functions selected from a set of integrity check functions, which integrity block is so encrypted as to permit its decryption only with a non-public key; and
   at the configured sending station selecting one or more data bytes from each data packet and producing an associated integrity check that is used with the integrity checks for the other data packets to produce the encrypted integrity block,
      wherein the selection of data bytes from a first data packet is random and the data bytes selected from remaining data packets are offset from the data bytes selected from the first data packet.

61. The computer data signal of claim 60 wherein the integrity block is encrypted in accordance with a shared secret key.

62. The computer data signal of claim 60 wherein the one or more integrity checks are produced by concatenating selected data bytes from respective data packets.

63. The computer data signal of claim 60 wherein the one or more integrity checks are produced by encoding selected data bytes from respective data packets.

64. The data signal of claim 60 further comprising instructions for;
   configuring at least one receiving station to decrypt the encrypted integrity block to reproduce the one or more integrity checks; and
   at the configured receiving station using the one or more integrity checks to authenticate the one or more data packets.

65. The computer data signal of claim 64 wherein the one or more integrity checks are associated with the appropriate one or more data packets prior to authentication.

66. The computer data signal of claim 60 further including configuring the sending station to transmit one or more extraneous data packets that are associated with the integrity block but do not pass authentication tests.

* * * * *